Feb. 25, 1964

C. E. MAIER ETAL 3,121,950

PRODUCTION OF TUBULAR STRUCTURES

Filed Jan. 15, 1960

FIG_1

FIG_2

FIG_3

FIG_4

*INVENTORS*
CURTIS E. MAIER &
ROBERT M. BRICK
BY

Mason, Porter, Diles Stewart,

ATTORNEYS

Feb. 25, 1964

C. E. MAIER ETAL 3,121,950

PRODUCTION OF TUBULAR STRUCTURES

Filed Jan. 15, 1960

INVENTORS
CURTIS E. MAIER &
ROBERT M. BRICK
BY
Mason, Porter, Diehl & Stewart,
ATTORNEYS

Feb. 25, 1964 C. E. MAIER ETAL 3,121,950
PRODUCTION OF TUBULAR STRUCTURES
Filed Jan. 15, 1960 5 Sheets-Sheet 3

INVENTORS
CURTIS E. MAIER &
ROBERT M. BRICK
BY
Mason, Porter, Diller & Stewart
ATTORNEYS

Feb. 25, 1964 C. E. MAIER ETAL 3,121,950
PRODUCTION OF TUBULAR STRUCTURES
Filed Jan. 15, 1960 5 Sheets-Sheet 5

INVENTORS
CURTIS E. MAIER &
ROBERT M. BRICK
BY
Mason, Porter, Diller & Stewart,
ATTORNEYS

United States Patent Office 3,121,950
Patented Feb. 25, 1964

3,121,950
PRODUCTION OF TUBULAR STRUCTURES
Curtis E. Maier, Riverside, and Robert M. Brick, Hinsdale, Ill., assignors to Continental Can Company, Inc., New York, N.Y., a corporation of New York
Filed Jan. 15, 1960, Ser. No. 2,680
2 Claims. (Cl. 29—528)

This invention relates to the production of tubular structures, and is particularly concerned with the preparation of such bodies from metal slabs which are assembled with anti-welding or resist material between them and are then subjected to rolling for effecting bonding of the metal parts, and reduction of the slab assembly to a composite strip having metal laminations separated by the residue of the anti-welding material and connected at the edges of such residue by integrating metal.

It is known to roll a solid billet having an internal core discontinuity containing anti-welding material whereby to form such a laminated strip, and to open or expand the same to form a tubular structure. Such tubular structures have projecting fins formed by the metal which integrates the laminations at the edges of the anti-welding residue. In practice, the edges of the rolled strip may be irregular and major trimming is required; and there is difficulty in performing such trimming of the strip before opening, when the resist residue is very thin, because such trimming should be made at a defined distance from the adjacent edge of the resist residue and without approaching the residue so closely, or intruding thereon, that leaks or cracks can develop in the tubular structure.

When tubular structures of small diameter are to be made, it is economical to prepare a multi-wide billet and roll therefrom a multi-wide strip. By "multi-wide" is meant a billet or strip which has two or more internal longitudinal core discontinuities spaced laterally apart by an intervening metal connecting portion which can join the body metal of the strip laminations between each pair of such discontinuities. Such a multi-wide strip can then be severed longitudinally along such intervening metal portions to provide a like number of narrower strips, each of which has surface laminations separated by a resist residue and connected at its edges by parts of the said edge and/or intervening metal connections. In practice, during rolling of such a billet, it is found that when three or more core discontinuities are present, the cores adjacent the edges are caused to spread more greatly laterally than cores at the center of width. Also, when several such cores are present, requiring severance of the individual strips, it becomes even more difficult to locate the positions of the resist residues and to guide the severance along lines spaced at least a minimum distance from each of the resist residues. The rolling often results in a longitudinal camber of the strip: that is, the resist residues do not have their edges as straight lines but as segments of large-radius circles at such camber regions: and attempts to sever the strips by straight lines can result in cutting too close to a resist residue or even intruding upon it, wherewith lengths of one or more individual strips cannot be expanded into non-leaking tubular bodies.

Also, when tubular bodies of closely controlled internal dimensions must be produced, for example for containers, the differential lateral spreading can lead to tubular bodies of differing dimensions.

According to the present invention, tubular structures of closely controlled tolerances of dimensions can be prepared from metal slabs.

An object of the invention is the production of such tubular structures by providing internal discontinuities of controlled dimensions between the slab assemblies, and by so shaping the exteriors of the assemblies that differential lateral spreading is compensated.

Another object is the production of such tubular structures with the inclusion between the slabs of tubular members which provide such internal discontinuities of predetermined dimensions.

Another object is the provision of such assemblies in which the slabs are formed with a contoured cross-section for attaining compensation of the differential lateral spreading.

Another object is the provision of such assemblies in which the slabs are formed with external longitudinal grooves for attaining compensation of the differential lateral spreading.

Another object is the provision of such assemblies in which the slabs are formed with external longitudinal grooves located relative to the edges of the internal discontinuity or discontinuities and having non-welding surfaces so that, during rolling, the groove walls are closed upon one another but provide surface weaknesses in the rolled strip which extend parallel to but spaced from the edges of the resist residues and permit accurate longitudinal severance along the strip without intrusion upon the residues.

Another object is the provision of such assemblies in which the slabs are assembled with abutting tubular metal bodies therebetween and such bodies have non-welding coatings at their edges extending substantially from slab to slab, wherewith the rolling of the assembly to form the strip causes the residues of such coatings to provide internal weakenings parallel to and spaced from the edges of the resist residues of the said internal discontinuities and whereby the strips can be separated longitudinally along such weakenings without intrusion upon the regions of such resist residues.

A further object is the provision of a metal billet for rolling into laminate strip form, and comprised of body metal slabs having accurately sized and located internal discontinuities with anti-welding or resist material therein, said slabs being connected together for containing the resist material and becoming bonded together during the course of rolling to form the laminate strip.

With these and other objects in view, as will appear in the course of the following description and claims, illustrative embodiments of the invention are shown on the accompanying drawing, in which:

FIGURE 11A shows the end of a billet assembly having both surface contouring and longitudinal grooves;

In these drawings, two metal slabs are united to an assembly with core discontinuities, and the parts are joined by pressure, as by passing the same between rolls. Such slabs may for example be 2 to 6 inches thick, and 6 to 16 feet long. They may be cast of the metal for forming the major portion of the lamination thickness, such as aluminum or its alloys, copper or its alloys, steel: and the ingots employed after dressing at least the contacting faces. The ingots may be hot rolled, and dressed, to provide the slabs. The dressing can be a scalping of the surface which is to be inside in the assembly, to form a plane in the practice of FIGURE 1, or a plane with an edge land in the practice of FIGURE 2. The scalped surfaces should be cleaned to remove machine oil or lubricants.

Figure 1:
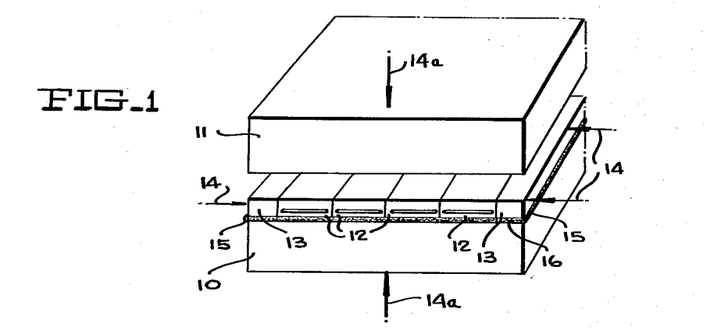
FIGURE 1 is a perspective view of parts of slabs and cores, in one form of practice.

In FIGURE 1, two slabs 10, 11 are illustratively of identical dimensions. The lower slab 10 has a number of cores 12, each being a flattened tube, placed thereon with the combined width of the cores being less than the width of the slabs. Two packing or filler pieces 13, having the thickness of the cores, are then placed alongside the layer of cores, and forces are exerted in the direction of the arrows 14 so that the fillers and cores are pressed into tight abutment along their lengths. The fillers 13 are then secured, as by welded seams 15, 16, so that the pressed position is maintained. The upper slab 11 is then placed over the cores 12 and fillers 13 and secured by like welded seams so that an assembly of the slabs, cores and fillers is produced.

Figure 2:
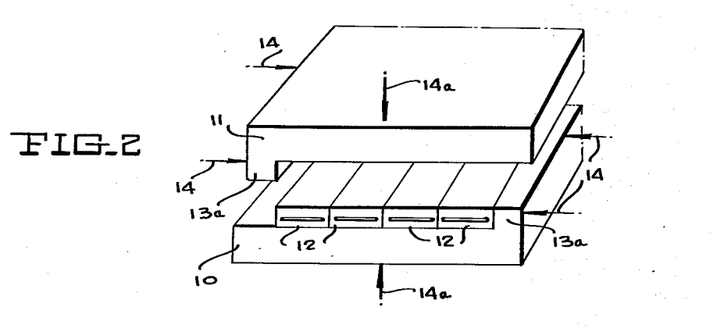
FIGURE 2 is a corresponding view, in another form of practice.

In FIGURE 2, a like assembly is prepared without the fillers 13. The slabs 10, 11 are here formed with lands 13a extending along one longitudinal edge of each and having a projection equal to the thickness of the cores.

The cores 12 are placed upon the lower slab 10, and the upper slab 11 is positioned: forces are then exerted in the direction of the arrows 14 so that the lands and cores are pressed tightly together. This position is then maintained by the use of the longitudinal welded seams 15, FIGURE 8.

Figure 3:
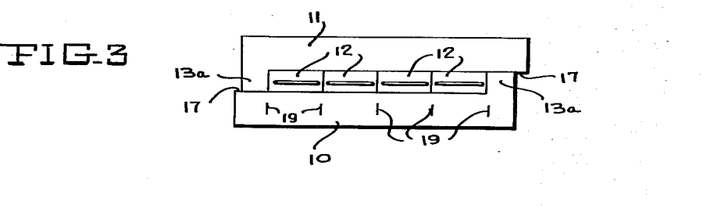
FIGURE 3 is an end view of the parts in FIGURE 2, showing permissive variation of position.
Figure 8:
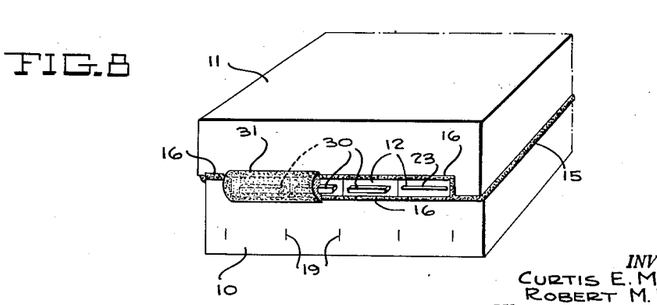
FIGURE 8 is a perspective view of the assembly and welding of parts as in FIGURE 2.

In each form of practice, the outer edges of the fillers 13, need not be flush with the edges of the slabs, nor the outer edges of the land 13a of one slab be flush with the edge of the other slab. Thus, in FIGURE 3, the upper slab 11 has its land 13a projecting an exaggerated distance onto the upper surface of the lower slab 10, and the latter has its land 13a spaced inward from the margin of the upper slab 11: such a condition is permissible, and results from the pressing of the preformed cores into tight abutment. It is feasible, before the final end welding as shown in FIGURE 8, to provide witness marks 19, as in FIGURE 3, on the slabs to show the locations of the abutment edges of the cores.

It is preferred to hold the slabs together, during the transverse compression, either by the weight of the upper slab if sufficient, or by clamping devices acting in the directions of the arrows 14a and permitting lateral movements for tight core abutment.

In practice, from one to twenty cores can be employed depending upon the desired internal dimensions of the tubular structures to be made, and the slab width which can be rolled upon the available roll stand, with allowance for lateral spread. In general, the slabs should be 2 to 4 inches wider than the total width of the cores, with the fillers or lands each being 1 or 2 inches wide.

Figure 4:
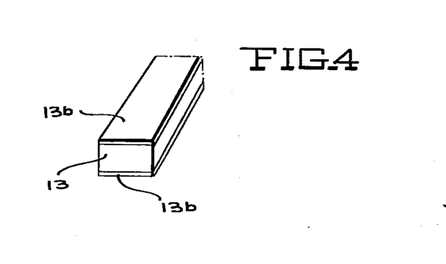
FIGURE 4 is a perspective view of a part of a lateral filler piece for FIGURE 1.

In each form of practice, weld promoting material can be placed upon the inner slab surfaces before the assembly. In addition or alternatively, the cores and fillers may have such coatings. Thus, in FIGURE 4, a filler 13 has such coatings 13b, the thickness being exaggerated in the drawing.

The welds 16 for joining the fillers and the slabs in FIGURE 1, and for joining the lands 13a and the slabs in FIGURE 8, are preferably extended for connecting each core to the slabs, for further joining the slabs and maintaining the cores against endwise movement.

Figure 5:
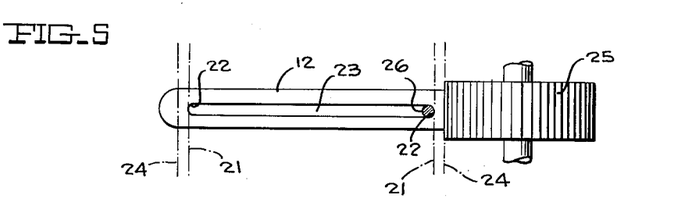
FIGURE 5 is an end view, on a larger scale, of a flattened tube core, and indicating the gaging thereof for end trimming.
Figure 6:
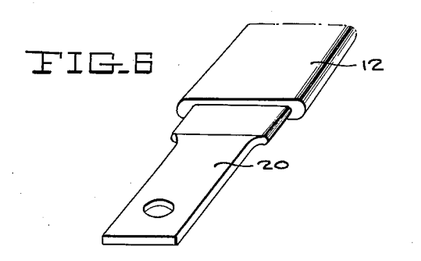
FIGURE 6 is a perspective view indicating an internal sizing operation upon a core.

The cores 12 can be made by flattening metal tubes to the cross-section shown in FIGURE 5. When great accuracy of the final tubular bodies is specified, the flattened tubes can then be given an internal sizing, FIGURE 6, by pulling therethrough an internal sizing tool 20, such as a broach or burnisher, particularly to assure uniformity in each core of the internal dimension between the lines 21, 21 of FIGURE 5, noting that it is preferable that the ends 22 of the channel area 23 be semicircular. The cores may be of metal of the same analysis as the slab metal: or a different metal may be employed, e.g., when an internal cladding effect is desired. Thus, stainless steel insert cores can be used with mild steel slabs, preferably with a thin nickel electroplating on the external core surfaces which are to be bonded. Titanium cores can be employed, with nickel plating on the bonding surfaces thereof, with mild steel. With aluminum alloy slabs, e.g., the so-called 5154 or 2024 alloys, the cores can be of so-called 1100 specification metal (2S or commercially pure aluminum). With brass slabs, pure copper cores can be used. Illustratively, when an organic resist is to be employed, with the slabs 10, 11 up to 6 or 8 inches thick, for forming a tubular structure having a wall thickness of 0.006 inch and a diameter of about 3 inches, the cross-sectional dimensions of the channel 23 for the cores 12 of a multi-wide billet assembly may be 4.58 inches wide at the midheight of the end surfaces 22, allowing for a 5 percent lateral spreading during rolling, and 0.125 inch high. The cylindrical tubing stock therewith can be 2.92 inches in internal diameter with a wall thickness of 0.300 inch.

The lateral external edges of such cores can then be trimmed to the lines 24, 24 which are parallel to and at a predetermined distance from the respective lines 21, 21 for determining the spacing between the channel areas 23 of adjacent cores. Such trimming may be done by milling, e.g., by a cutter 25 which operates at the predetermined distance from the gage fingers 26 located against the inner surfaces 22 at the ends of the core. Therewith, the end trimming, FIGURE 5, of the illustrative flattened tube can provide a plane end surface 24 spaced 0.065 inch from the inner end surface 22 at the midheight thereof.

Figure 7:
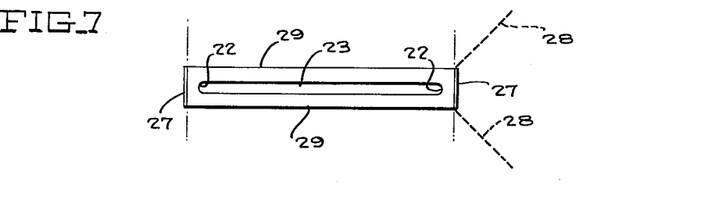
FIGURE 7 is an end view of the core of FIGURE 5, after end trimming and coating.

The trimmed ends of the cores, at lines 24 are then coated with a weld-preventing or resist material 27, FIGURE 7. This may be a carbon film provided by smoking these end surfaces while employing masks 28 to prevent smudging the upper and lower surfaces 29; by use of a slurry of refractory powder such as alumina, zirconia, talc, or the like, with permissive inclusion of a binder, and drying; or by flame spraying such a refractory thereon. Such a coating can be thin. For the illustrative example, each end surface can receive a coating 0.002 inch thick, wherewith two adjacent core channels 23 are spaced apart 0.134 inch when the cores are brought to tight abutment.

One end of such assembly is then sealed, as shown by FIGURE 8. The core areas 23, for example, are plugged by wedges 30 which closely fit the same: and then a broad welded seam 31 is applied over the wedges 30, the ends of cores 12 and onto the ends of the slabs 10, 11, therewith building onto existing smaller welded seams 16. Thus, in FIGURE 8, at the right, a core 12 has its channel area 23 open, another core 12 has the wedge 30 therein, a third core 12 has its wedge 30 partly covered by the seam 31, and a fourth core is entirely covered by the seam 31: this is an intermediate stage of end sealing, which is completed until the seam 31 covers all cores 12 and their wedges 30.

At this stage, the outer surfaces of the slabs 10, 11 can be dressed. In FIGURE 8, the assembly of slabs 10, 11 with the cores covered by the end seam 31 is shown as being passed beneath a gang of milling cutters 35 which cut longitudinal external grooves 36 along a surface of the assembly which is to be contacted by rolls during the thickness reduction and roll-bonding. The lower surface in FIGURE 9 shows the grooves 36 present therein.

Figure 9:
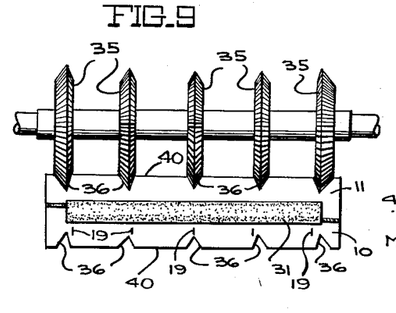
FIGURE 9 is a diagrammatic view showing the provision of longitudinal external grooves in such an assembly.
Figure 10:
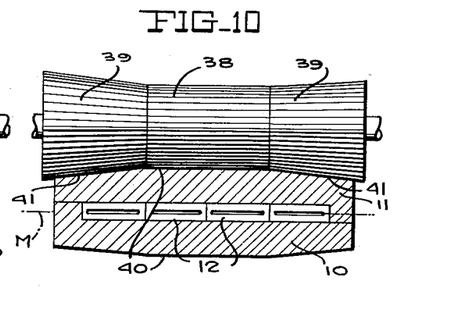
FIGURE 10 is a corresponding view, showing a contouring of an assembly.

The opposed roll-engaging surfaces 40 in FIGURE 9 are shown as flat and parallel. In FIGURE 10, the assembly of slabs and cores is shown as being contoured by the action of a gang of milling cutters 38, 39 wherewith the central cutter 38 is cylindrical for forming the central part 40 of the width of the assembly parallel to the median plane M, while the angle cutters 39 form the lateral parts 41 of the surface to converge from the center thickness to the lateral edges of the assembly. Preferably, both upper and lower surfaces are so contoured, to symmetrical form. The parallel surfaces of FIGURE 9 and the opposite parallel surfaces 40 of the doubly contoured assembly made as in FIGURE 10, permit regular entry and rolling. Preferably, the roots of the grooves 36 are opposed in pairs, as shown in FIGURE 12, and at predetermined positions relative to the core ends.

Figure 11:
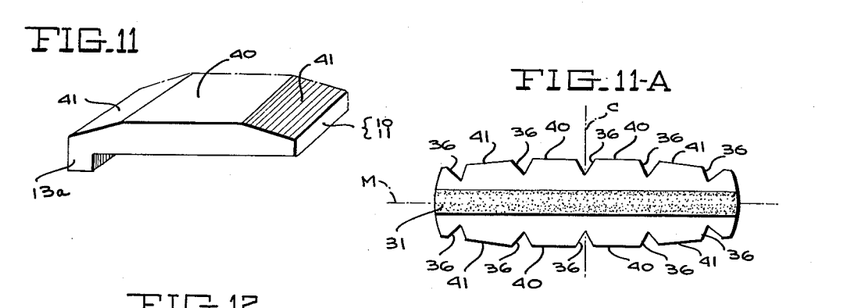
FIGURE 11 is a perspective view of a slab contoured before assembly.

When the contour reductions at the lateral edges are large, with corresponding cost of machining and wastage of scrap if milled from assemblies of rectangular sections, the slabs may be initially cast with a section as shown in FIGURE 11, wherewith scalping, dressing, and external contouring as by the milling cutters of FIGURE 10, involve only minor removals of material. Preferably, the lateral margins of the surfaces 40 are closely aligned with the areas of abutment of core ends.

Both contouring, as in FIGURE 10, and longitudinal grooving, as in FIGURE 9, may be employed, as shown in FIGURE 11A.

Figure 12:
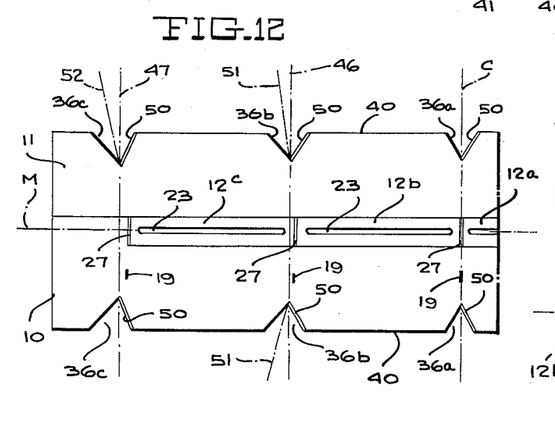
FIGURE 12 is a conventionalized upright sectional view of part of an assembly prior to rolling.

Preferred shapes and positions of the longitudinal external grooves 36 of FIGURE 9, relative to the cores, are shown in FIGURE 12, where one lateral half of the assembly, relative to the upright central plane C is shown. The grooves 36a at the plane C have their roots at this plane, and the plane passes through the end dressing 27 of the two central cores 12a, 12b. In practice, during the rolling of such an assembly, the surfaces 40 in contact with the rolls undergo no significant lateral spreading, whereas the metal between them has differential spreading from such surfaces 40 to the median plane M. To compensate for this, the next outward grooves 36b have their roots at the upright plane 46 which passes through the illustrated core 12c so that the end dressing 27 thereof is closer to the central plane C than the plane 46: and comparably, the laterally outermost grooves 36c have their roots at the upright plane 47 which passes laterally outside of the outer dressing 27 of the core 12c, and with a greater distance between plane 47 and the outer dressing 27 than between plane 46 and its corresponding dressing 27.

The grooves 36a, 36b, 36c are provided, after forming, with coatings 50 on one or both walls, so that these walls are not welded together during rolling; but the grooves provide longitudinal weakenings in the rolled strip, so that the strip may be severed accurately along its length.

The grooves 36a, 36b, 36c also serve to control the differential spreading of the cores 12b, 12c; which otherwise would spread during rolling so that the residue of the channel space 23 of core 12c is wider than the residue of the channel space 23 of core 12b. Therewith, the central grooves 36a, which are to provide for later longitudinal severence along the center of width of the multi-wide strip, are preferably of small section, so that they have little influence upon the lateral spreading of metal: for example, they may be made of V-shape with a very small included angle, such as 8 to 12 degrees, merely sufficient to receive the weld-preventing coating. The other grooves should have successively increasing cross-sections according to their distance from the center plane C. This increase can be attained by having V grooves of successively greater angles, or by having deeper grooves, or both, as shown in FIGURE 12. These outer grooves can have angles of 10 to 70 degrees, depending upon the number of cores present, the thickness of the slab assembly, and the rolling schedule. The spacings between the roots of a groove of a pair, together with the height of the associated internal notching coating 27 should be about 25 to 60 percent of the thickness of the assembly. It is preferred to have this billet thickness dimension occupied for at least half by the slab metal.

Further, due to the aforementioned lateral creepage or spreading of the metal between the surfaces 40 and the median plane M, the roots of the grooves shift relatively outward compared to originally aligned points of the surfaces 40. It is preferred to have the longitudinal weakenings, provided by the residues of the coatings 50, directed at right angles to the outer surfaces of the rolled strips, so that the broken sections thereof have essentially flat edges; and therefore, it is preferred to have the grooves 36b, 36c tilted. That is, the bisector planes 51 of the grooves 36b (FIGURE 12) are tilted relative to the median plane M so that during rolling the movement of metal to close the grooves, and then the relative lateral movement of the groove root compared to the behavior at the surface of the strip being rolled, will cause the residues of coatings 50 to assume the upright position. Comparably, the bisector planes 52 of the outermost grooves 36c are correspondingly tilted but by a greater angle due to the greater lateral spreading of the metal at the roots of grooves 36c compared to that at the roots of grooves 36b.

In practice, such roll reduction of a rectangular billet causes a lateral spreading, whereby the channels are differentially widened: that is, assuming that the core channels 23 are originally of identical dimension transversely of the billet, the rolled strip product therefrom will have the residues of channels 12a, 12b narrower than those of channels 12c. The amount of the widening is dependent upon the size and material of the billet, the temperatures and other conditions of rolling including the reduction per pass, the rolling lubricant, and other recognized factors, along with the core dimensions relative to those of the billet.

According to this invention, in FIGURES 9 and 12, the billet is also provided with a plurality of grooves extending longitudinally, illustratively in the upper and lower surfaces in aligned pairs. With the four channel cores shown, and five pairs of such grooves, the grooves 36c nearest the edges have a greater cross-section than the grooves 36b nearer the center of width, and the grooves 36a at the center have the least cross-section. In the illustrative form, the grooves have differing depths and differing inner corner or root angles: but it will be understood that either differential, for the successive change of groove section, can be employed in appropriate cases. When the billet so prepared is rolled, the lateral flow of metal causes the grooves 36a at the center to become closed first, and thereafter lateral spreading of the metal at the central region is accompanied by lateral spreading of the core channels 12a, 12b. In turn, the grooves 36b and then 36c are closed; and therewith there is little lateral spreading of the core channels 12c at the edges until the grooves 36a are closed. With the given billet material and cross-section of the grooves, this can be accomplished, for example, at such a point in the rolling passes that the normal greater spreading at the successive outward channels with plane surfaces on the billet is now effective to bring the strip, at the end of the rolling schedule, to a condition at which the early greater spreading at the center is compensated by the later greater spreading toward the lateral edges, and the final strip has the residual resist layers of essentially the same width within prescribable minor tolerances.

In the form of FIGURES 10 and 11A, the general cross-sectional outline is not rectangular; but the upper and lower surfaces convergently taper toward the lateral edges illustratively with the planes 41 being symmetrical relative to the median plane M and also symmetrical across the upright central plane C. Central plane surfaces 40 are parallel to one another and symmetrical to the median plane M, for initial contact with the reduction rolls, and assist in procuring a symmetrical reduction of the billet into the strip. The width of the surfaces 40, from outer edge to outer edge should be less than the like width of four cored units for a billet having an even number of cores; and less than the like width of three cored units for a billet having an odd number of cores. Illustratively, the parallel surface portions 40 span the center of width C of the billet but do not extend laterally from the center to a point beyond the notch-providing coating 27 between cores 12b, 12c. In this form, the reduction begins at the center of width, that is, at surfaces 40, and hence lateral displacement of metal and core material is initially at the space between the innermost cores 12a, 12b and over parts of the widths of these cores; gradually extending toward the lateral edges during the course of the thickness reduction. The billet can be rolled lengthwise for all passes; during subsequent longitudinal rolling, the outer cores are widened differentially to the inner cores by the lateral spreading effect: and the final strip has core residues of the same width.

In the form of FIGURE 11A, the ingot is contoured as in FIGURE 10, and also has grooves 36 with root angles which increase from the center toward the lateral margins, as in FIGURE 12. Thus, there are two predisposed conditions in FIGURE 11A, by which compensation of variant lateral spreading is attained. The flat parallel surfaces 40 permit entry to the rolls at the first pass. The early reduction or reductions have a compensation for excessive spreading during the closing of the central grooves 36a, as in FIGURE 12, and later reduction or reductions by the closing of the lateral grooves 36b, of greater angle and cross-section. Therewith, also the crowned or contoured shape by the inclined planes 41 affords a greater initial spreading at the center cores 12a, 12b, and a later greater spreading at the lateral cores 12c, so that the total of compensatory effects results in the widths of resist residue in the final strip being of the preselected dimensions, e.g., all having the same width.

The figures show the employment of several methods of effecting compensation for lateral spreading, wherewith each can be used alone, or by conjoint use each contributes its effect and neither demands major removal of metal with the possibility of distortion arising therefrom. Therewith, ingots can be cast of general form, and then the ingot prepared for a selected rolling schedule by the contouring and by the use of grooves of predeterminable angle, depth and cross-section.

Figure 13:
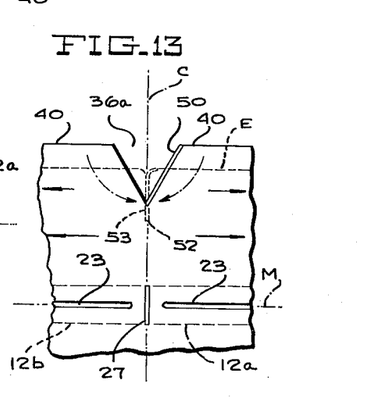
FIGURE 13 shows a part of FIGURE 12, and indicating flow of metal during rolling.

During the rolling, the grooves become closed, as illustrated in FIGURE 13, for a groove 36a at the center plane C of width. Therewith, the roll contacting surfaces 40 undergo essentially no widening, from side to side of the billet, but as the billet thickness is reduced to provide the surface E, metal moves to close the groove, as shown conventionally by the dash-line arrows in FIGURE 13, and the general reduction of thickness causes the groove root to move toward the median plane M to a point 52, with the groove coating 50 now forming a weakening or notching 53 essentially at right angles to the planes E, M at this central groove. However, the point 52 does not move toward the median plane M in proportion to the overall reduction of billet thickness, but a lesser amount, due to the employment of metal adjacent to the surface for filling the grooves. Therewith, the metal between the two roll-contacting surfaces 40 of FIGURE 12 undergoes lateral movements indicated by the solid-line arrows in FIGURE 13, and also a like lateral spreading of the core channels 23 can occur. The amount of this lateral spreading depends upon the metal and its condition during rolling, and upon the degree of reduction per pass. For example, with low reductions such as 5 to 10 percent per pass in hot rolling, the longitudinal extension may convert a billet of 8 inches total thickness and 12 feet long to a strip of 0.050 inch thick and over 1,800 feet long, and with a total lateral spreading of say 1 percent so that an original 33 inch width becomes about 33½ inches. When the same billet is hot-rolled to the same strip thickness by a lesser number of passes, e.g., with reductions of 50 percent per pass, the lateral spread may be 10 or more percent, e.g., a 33 inch original width may increase to 36 or 37 inches. A desirable practice is with a spreading of 4 or 5 percent, wherewith an original width of 33 inches will spread to 34 or 35 inches. Also, the lateral spreading is usually not mathematically related in linear ratio to the position of the metal between the original planes 40: that is, the lateral edges may have a simple rounded cross-section, or may have a multiple curvature with a greater spreading between a surface 40 and the median plane M than at the median plane: but such effects are obvious to the operator and can be accurately cared for by the original provision of external grooves and contouring, and by selection of the schedule of hot-rolling reductions, reheatings, and cold rolling. FIGURE 13 shows the effects at one surface 40, and it will be understood that symmetrical effects are occurring at the other surface in the illustrated practice: and that similar symmetrical closures are occurring at grooves spaced from the center plane C, but with the internal lateral metal flow causing the originally inclined planes of the residues 53 to rotate toward the right-angle positions relative to the strip surfaces during the successive passes.

Figure 14:
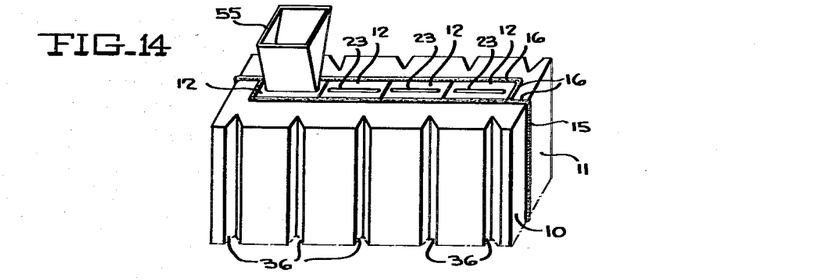
FIGURE 14 is a perspective view, showing loading of core channels with a resist.

Prior to rolling, it is preferred to introduce an anti-welding or resist material into the internal core channels 23. As shown in FIGURE 14, this can be accomplished, with one end of the billet sealed by welds 31, by placing the billet with the sealed end down, and introducing the resist material. Thus, funnels 55 can be employed for each channel 23, one being illustrated in FIGURE 14, for directing a powdery, granular, strip-like or fluid resist material into the channels 23 without soiling other parts of the billet or loss of the resist material.

Suitable resist materials for preventing welding of the internal surfaces of the channels together during rolling depend upon the metals present and the temperatures to be employed in the schedule. For aluminum or its alloys, it is preferred to employ a soluble solid, such as sodium chloride in a fine powder, noting that the salt particels during hot rolling at appropriate temperatures up to 1,200 degrees F., for aluminum, behave plastically and spread regularly as flakes; or an organic compound which does not lose its resist properties, such as epoxy, polyethylene, polypropylene, polycarbonate, polyamide (nylon), polyester (e.g., terephthalic-isophthalic glycols), silicone, phenolic novolak, cyclic polyhydrocarbon, polymethyl styrene resins, iron or aluminum stearate, which are extensible solids at room temperature and become liquids at temperatures below 500 degrees F. With such organic resists, the assembly may be preheated to about the melting point of the resist, and then filled as in FIGURE 14 with the granular resist which then melts to fill the cross-section of the core channel: upon end sealing and rolling, the reduction of the core channel produces a complete filling, and a very thin residue has been found competent to prevent welding; for example, a final strip of 0.012 inch total thickness can be directly calipered to determine a thickness of 0.006 inch for each lamination because the resist residue may then be 0.0001 inch or less, and essentially invisible. It is also feasible to heat the assembly to say 1,000 degrees F., then load with resist as in FIGURE 14, and immediately subject to rolling: wherewith the resist is enclosed against oxygen entry and continues to perform its weld-preventing function. With such organic resists, also, a thickness of 0.125 to 0.250 inch is ample for an assembly 8 to 12 inches thick for rolling to 0.012 inch: in fact, a large part of the resist can then be squeezed out during the rolling without causing later welding to occur. For copper assemblies, the sodium chloride or organic resists can be employed; or graphite, talc, alumina, and other non-melting powders used. When loading with such powders, it is preferred to vibrate the assembly, FIGURE 14, to assure a uniform packing density. With mild steel, a high-melting salt such as barium chloride may be used, or the aforesaid non-melting powders. The resist is selected upon the basis of the metal walls to come into contact therewith. Thus, with core tubes of copper employed with aluminum slabs, the resists for copper can be used. When stainless steel or titanium cores are employed between mild steel slabs, and the core interiors are kept free of bonding fluxes, their surfaces alone may be sufficient, or a high-melting salt may be employed.

After the resist has been introduced into the channels 23, the open ends may be closed by wedges 30 and a welding seam 31 applied, as illustrated in FIGURE 8.

The billet assembly is then subjected to the rolling schedule. In practice, thick slabs do not weld by roll bonding to the cores 12 to a satisfactory extent during the early hot rolling passes: and hence the peripheral welds 15, 31 are necessary to prevent relative shifting and alligatoring. This is particularly the case with billets formed from slabs of aluminum and aluminum alloy, and is present to a lesser extent with steel slabs. For example, when a billet assembly with a total thickness of 8 to 12 inches is being hot rolled at a temperature customary for such hot rolling, the integration by hot roll bonding becomes significant when the strip thickness is below one inch for steel and one-eighth inch for aluminum and its alloys: and is complete when the strip has reached a total thickness of around 0.050 inch.

This bonding can be facilitated by employing bond-promoters at the surfaces to be integrated. For example, very thin zinc coatings on the surfaces 29, FIGURE 7, of the cores 12 can be employed, e.g., to the extent of 0.001 inch thickness or less. During the course of roll-bonding, this coating becomes integrated into the metal structure and, at such thickness, has no effect of causing hot shortness or rupture at the interfaces. Thin metal plating can be employed with mild steel or stainless steel slabs or cores.

Figure 15:
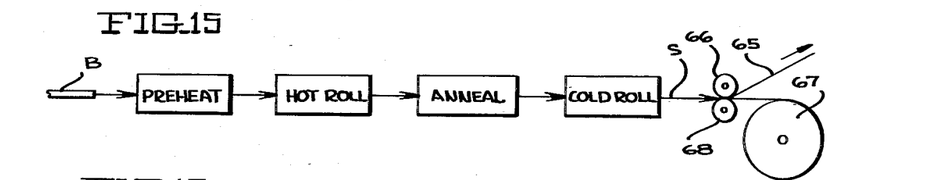
FIGURE 15 is a diagrammatic view illustrating a schedule of rolling of an assembly.

The course of such a rolling schedule is illustrated by the flow diagram of FIGURE 15, in which the billet B is subjected to preheating, is then hot rolled for example from 8 inches to 0.090 inch, is then annealed, and finally cold rolled to a total thickness of 0.012 inch wherewith a desired work-hardening is being accomplished, to form a strip S.

The marginal portions of the billet, between the outermost external longitudinal grooves, illustratively the grooves 36c in FIGURE 12, are reduced therewith to the final over-all thickness of 0.012 inch, with welding of the slabs to one another at the lands 13a or through the fillers 13, noting that the contact surfaces can be previously provided with bond promoting agent. The residues of the groove coatings 50 provide surface weakenings 60, FIGURE 17, for these outermost grooves 36c, and like weakenings 61 for the grooves 36a, 36b which are located, in the final strip, in respective alignment with the abutments between cores. Each of the weakenings 60, 61 is located in alignment with a residue 27 which was provided on the core ends, FIGURE 7. The essentially solid metal at the lateral edges of the rolled strip may be removed at the completion of rolling, employing the aligned weakenings 27, 60 as guides so that the severance occurs at predeterminable distance from the resist residue 62 of the adjacent cores, regardless of longitudinal camber in the rolled strip, or edge cracking in the edge portions. Such edge portions 65, FIGURE 17, can be easily torn away at edges 72, FIGURES 15, 17 and 20, by employing narrow rolls 66, FIGURES 15 and 17, around which such portions 65 may be led as shown by the arrow in FIGURE 15, while the rest of the strip may be collected as a coil 67. A counter roller 68 may be employed to guide the strip to the coil.

The coil 67 can be subjected to heat treatment.

The strip thus prepared is multi-wide in the illustrated practice, and is comprised of four widths, S–1, S–2, S–3, S–4, corresponding to the illustrative use of four cores in FIGURES 1–14: it being understood that the number of cores usable depends upon the required final core residue width, the length of the rolls in the available reduction roll stands, and the lateral spread for the billet material and the rolling schedule.

Figure 16:
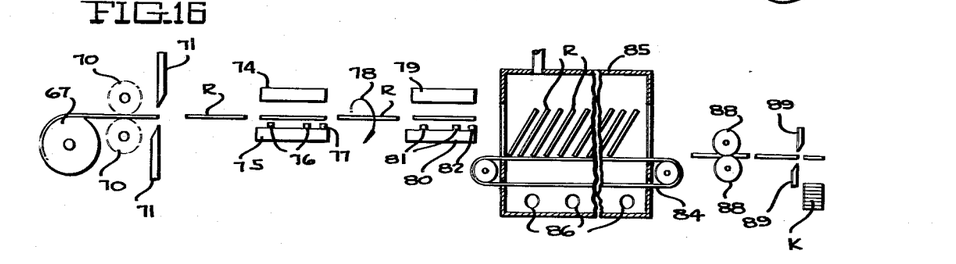
FIGURE 16 is a diagrammatic view illustrating the conversion of a rolled strip into decorated body blanks.
Figure 17:
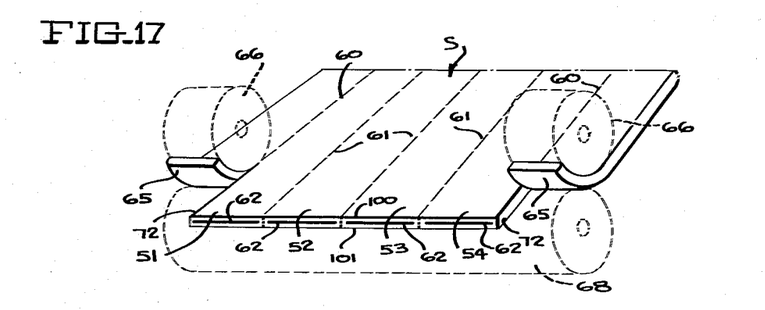
FIGURE 17 is a perspective view, on an enlarged scale, showing a trimming of the edges of a rolled strip.

The coil 67 may then be unwound, or the strip S directly fed from the edge-removing operation, to rotating cleaning brushes 70, FIGURE 16, and thence to a transverse severing operation, such as the guillotine knives 71 by which it is severed into sections R of desired length. Because the edges 72 of the strip, FIGURE 17, are accurately parallel to the adjacent edges of the resist residues, and any longitudinal curvature or camber of the strip has such a large radius that a given section has essentially straight edges, these edges 72 can be employed for aligning the strip with the knives 71 so that each section is a rectangle.

When the final articles are to have external decoration such as lithographed pictures, lettering, and the like, and a baking oven is available for receiving sheets of known maximum surface dimensions, the width of the multi-wide strip should be no greater than one such dimension, and the sections R should be no greater than the other such dimension. The external coating can comprise an all-over base coat and local decoration by pictures, words, etc. The printing may be effected by printing plates 74, one being illustrated and the number depending upon the number of coats and colors to be used; the section being supported on a bed platen 75 for each printing, with lateral guide pins 76 to engage an edge 72 of the section, and an end stop pin 77. The section, after printing and preliminary drying of the ink, can be turned over, as indicated by the curved arrow 78, about a longitudinal axis and subjected to like printing operations at its other surface, for example by the illustrated printing plate 79 with the bed platen 80 having lateral guide pins 81 to engage the same edge 72 as the pins 76, and an end stop pin 82. This use of a single trimmed edge against guide or gage pins, with a stop pin against another edge, assures accurate registration for the several printing operations. The printed section can now be placed upon the usual racks of a conveyor 84 moving in the baking oven 85 which is heated by hot gases from the pipes 86.

The section as it emerges from the baking oven can be multi-wide, multi-high, with accurately located lithography on each side.

To separate the multi-wide, multi-high section into individual blanks K, the rolls or cutters 88 may be employed to effect severance of the strips S-1, S-2, S-3, S-4 from one another: and the strips cut to single-blank heights by guillotine knives 89.

Figure 18:
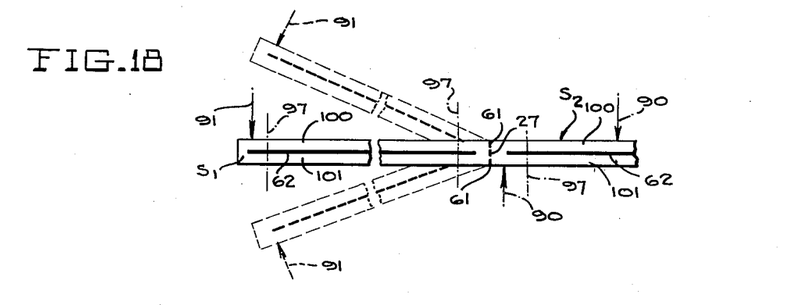
FIGURE 18 is an end view, showing the notch-breaking of a multi-wide strip or section to provide single-wide strips.
Figure 19:
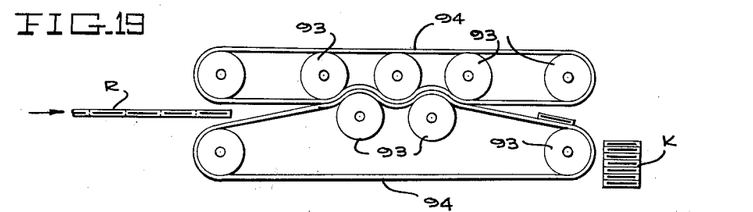
FIGURE 19 is a diagrammatic view of a roller device for notch-breaking a multi-wide strip.

It is also feasible to separate the individual strips S-1, S-2, etc., by flexing about longitudinal axes so that notch-breaking occurs along the planes of the aligned resist residues 61, 27. Thus, as shown in FIGURE 18, a strip width S-2 is held by forces indicated by arrows 90, and forces indicated by the arrows 91 are exerted on the strip width S-1. Thereby, the metal between the resist residues becomes overstressed, as the width S-2 is bent back and forth between the dash line positions, and breaks sharply along the plane determined by the inner and outer notch weakenings. It has been found that breakage can be accomplished by two to five flexures, at desirable original dimensions of the coatings 27, 50, and groove depths. This can be done, without clamping for the forces designated by the arrows, by passing the section R through a set of staggered rollers 93, FIGURE 19, as used for levelling or straightening a sheet, with the notch-weakenings extending parallel to the roll axes so that the stresses are being exerted at the weakening planes and the blanks K are broken apart before emerging. When the individual strips S-1, S-2, etc., are narrow, belts 94 may be used to prevent jamming.

Figure 20:
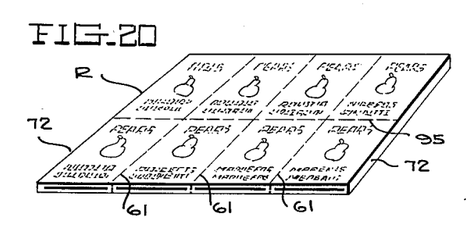
FIGURE 20 is a perspective view of a multi-wide, multi-high trimmed section of a rolled strip.

A four-wide, two-high section R is shown in FIGURE 20, for providing eight individual blanks upon breaking along the longitudinal weakenings 61 and severance along the transverse line 95. Each blank is illustrated as having a picture and lettering on the visible upper face thereof, and the same or other lithography may be on the lower face. Preferably, this decoration terminates, for each blank, short of the weakenings 61, and at the sheet edges including the edges which will be formed by severance at line 95; wherewith the pictorial and lettering decoration can terminate inward of the regional boundaries determined by the edges of the residues 62 of the core resists in the channels 23. That is, the individual blank K of FIGURE 21 has the picture and letters within the area defined by the lines 97, 98, FIGURES 18, 20 and 21, where the lines 97 are relatively inward of the edges of residue 62, and the lines 98 are spaced from the upper and lower edges so that when flanges are formed at such upper and lower edges, the decoration does not extend thereto and become obscured when ends are seamed to the flanges.

Figure 21:
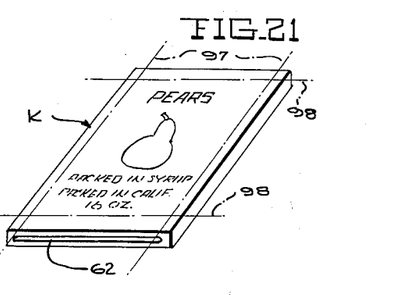
FIGURE 21 is a perspective view of a single body blank.
Figure 22:
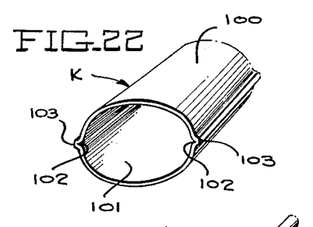
FIGURE 22 is a perspective view of the blank of FIGURE 21 in partly opened condition.

The blank of FIGURE 21 may then be opened or expanded to tubular form by bending the surface laminations 100, 101 apart as shown in FIGURE 22, wherewith the edges of the blank move closer together, and the inner wall surfaces at the edges of the resist residue 62 now appear at re-entrant angles 102. The solid metal connections between the laminations are now present as projecting fins 103 of double the wall thickness of the laminations 100, 101 in this illustrative form. If desired, they may be trimmed before or after opening the blank: noting that the severance along lines 60, 61 has accurately established the locations of the edges of the resist residues 62. The opening can be continued, with bending of the laminations, to obtain a desired cross-sectional shape: with a circular cylinder being shown in FIGURE 23.

Figure 23:
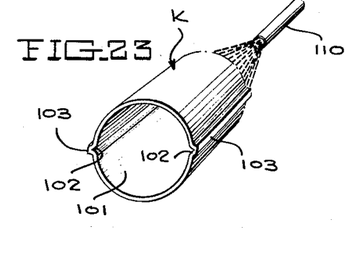
FIGURE 23 is a similar view, with the blank fully opened.
Figure 24:
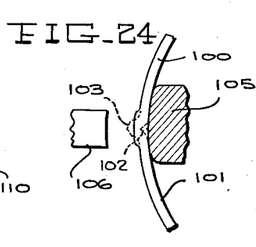
FIGURE 24 is a view, on a larger scale than FIGURES 21–23, showing the conforming of a body fin.
Figure 25:
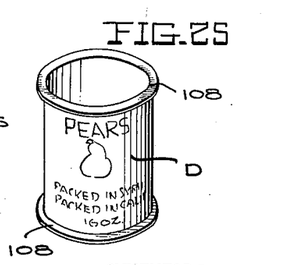
FIGURE 25 is a perspective view of a container body formed from such a blank.

For many purposes of such tubes, it is preferred to reduce the projection of such fins, e.g., when making container bodies. For this purpose, as shown in FIGURE 24, the projections can be hammered down, by supporting the internal surfaces of the laminations 100, 101 on an internal anvil 105 and employing pressure, e.g., by an impact tool 106, to flatten the projection until its radial dimension is, say, 1½ to 2 times the thickness of the wall-forming laminations 100, 101. Therewith, the re-entrant angles 102 of FIGURES 22 and 23 are reduced essentially to conformity with the rest of the internal wall surfaces. By having the decoration terminate short of the flattened region, there is no distortion of the decoration. Flanges 108 can then be turned at the ends, FIGURE 25, for seaming to ends when the body D is to form a container.

The interiors of the tubular bodies can be coated with enamels. Thus, in FIGURE 23, the formed body may be sprayed internally with an organic enamel composition by use of a nozzle 110. When a refractory resist such as powdery alumina, zirconia, and like inert particles is used, particles can become embedded in the metal at the interior surfaces, during the course of the rolling and extension of length, and can serve for keying the enamel so that an adherent coating is provided upon the usual baking for eliminating the enamel solvent and curing the organic resin or like base. When an organic polymer resist such as epoxide resin, polyethylene or polypropylene resin, polymethylstyrene resin, polycarbonate resin, a polyvalent metal stearate, terephthalic or isophthalic glycol ester polymer resin, novolac phenolic resin, is employed with roll-bonded slabs of aluminum or aluminum alloy or other metals which can be heat-treated or hot-rolled at temperatures below about 1,100 degrees F., at which the enclosed resin continues effective as anti-welding material, the residue thereof on the inner surfaces of the tubular body is receptive to an organic enamel composition in which the solvent is also a solvent for such polymer resist, so that the enamel coating after baking is a composite of the resin of the resist and the resin of the organic enamel.

It will be understood that the described embodiments are illustrative and that the invention can be practiced in many ways within the scope of the appended claims.

What is claimed is:

1. The method of forming a rolled metal strip of laminate material capable of being separated longitudinally along internal weaknesses to form narrower strips each capable of opening into a tubular body, which comprises preparing a plurality of flattened tubes of integral metal, each having plane portions at its edges and an internal channel along its length, placing the tubes between two metal slabs with the plane portions having a thin layer of antiwelding material between each two adjacent tubes, at least one of the slabs having longitudinal external grooves in its roll-contacting surface, said grooves each being located substantially opposite a said plane edge portion of a tube when the metal portions and tubes are pressed together, providing between the slabs metal portions substantially of the thickness of the tubes and located laterally outside the laterally outermost tubes, pressing the said metal portions toward one another in the lateral direction and against said laterally outermost tubes and therewith effecting abutment of the metal portions and tubes at their adjacent edges as a group extending in the lateral direction across the slabs, edge-welding the tubes, metal portions and slabs together and sealing the channels at one end, inserting antiwelding material into each channel, and subjecting the assembly to a schedule of heating and rolling operations thereby to effect roll-bonding of the slabs, metal portions and tubes and the reduction of the assembly to a strip having at its surface laminations of metal separated by the residues of the antiwelding material with the laminations connected at the edges of each said residue by integrating metal and having longitudinal internal weaknesses located within said integrating metal, and whereby to cause the metal of the slab to flow laterally for bringing the groove walls together and to essential abutment and to form a strip having smooth roll-engaged surfaces with a weakness of the abutting groove walls in substantial alignment with the rolled residue of the layer of antiwelding material originally present at the said plane edge portions.

2. The method as in claim 1, in which the grooves have a wall-surface coating of an antiwelding material for assuring non-welding of the abutting groove walls in the strip.

References Cited in the file of this patent

UNITED STATES PATENTS

| | | |
|---|---|---|
| 1,938,633 | Maskrey | Dec. 12, 1933 |
| 2,814,095 | Lieberman | Nov. 26, 1957 |
| 2,828,533 | Fromson | Apr. 1, 1958 |
| 2,983,993 | Johnson | May 16, 1961 |

FOREIGN PATENTS

| | | |
|---|---|---|
| 774,008 | Great Britain | May 1, 1957 |
| 814,979 | Great Britain | June 17, 1959 |